United States Patent [19]

Chaffee

[11] Patent Number: 4,803,697
[45] Date of Patent: Feb. 7, 1989

[54] COLD WELDED LASER MIRROR ASSEMBLY

[75] Inventor: Edwin G. Chaffee, Salt Lake City, Utah

[73] Assignee: American Laser Corporation, Salt Lake City, Utah

[21] Appl. No.: 117,668

[22] Filed: Nov. 5, 1987

[51] Int. Cl.⁴ .............................................. H01S 3/08
[52] U.S. Cl. ..................................... 372/107; 372/103
[58] Field of Search ..................... 372/55, 61, 103, 107

[56] References Cited

U.S. PATENT DOCUMENTS 4,001,720  1/1977  Carbonetta, Jr. .............. 331/94.5 G
4,153,317  5/1979  Ljung et al. ......................... 372/107

FOREIGN PATENT DOCUMENTS 3326092  1/1985  Fed. Rep. of Germany ...... 372/103

Primary Examiner—William L. Sikes
Assistant Examiner—B. Randolph
Attorney, Agent, or Firm—Olive & Olive

[57] ABSTRACT

A gas laser tube is fitted with internal mirrors only and no windows. The laser tube is processed by heating the tube with the ends open in a vacuum oven to drive out contaminating substances. The mirrors are installed by cold welding after the tube has been decontaminated and filled with a fresh supply of its operating gas. The mirrors mount on flexible bellows which enable the mirrors to be easily aligned.

2 Claims, 2 Drawing Sheets

COLD WELDED LASER MIRROR ASSEMBLY

BACKGROUND

Field Of The Invention

The invention relates to gas lasers employing internal mirrors and more specifically to a method of mounting internal mirrors and to a gas laser having internal mirrors mounted by such method.

Background Art

U.S. Pat. No. 4,001,720 illustrates a gas laser with windows and external mirrors by way of reference. Reference is also made by way of reference to applicant's copending application Ser. No. 942, 345, filed Dec. 16, 1986, entitled "Segmented Laser Tube Structure" which illustrates an argon gas laser tube structure of a type to which the present invention may be applied.

Using an argon gas laser by way of example, the conventional method for assembling a laser tube employing windows and external mirrors generally requires the following steps:

(a) Assemble tube with windows.
(b) Connect tube to vacuum/gs source.
(c) Bake to 200° C., under vacuum.
(d) Activate cathode.
(e) Fill with argon gas.
(f) Start tube and lase to determine that tube is clean; a loss of power indicates windows are dirty.

The foregoing method for installing windows to be used with external mirrors has at least these disadvantages:

(a) The presence of the glass windows inherently requires that the tube not be heated in excess of 200° C. during assembly.

(b) Windows inherently get contaminated during processing and must be replaced by new windows in final assembly thus there is considerable window wastage.

(c) Contamination can exist between the windows and the mirrors.

(d) Aside from material wastage, the process is time consuming.

(e) Windows are inherently required at the tube ends.

The need for use of windows is eliminated when the laser tube is fitted with internal mirrors. This eliminates optical losses due to the windows and possible contamination between the windows and the mirrors. It is generally recognized that the use of removable and replaceable windows with external optics produces a more satisfactory tube. However, tubes with internal mirrors are generally more difficult to rework than are tubes with external mirrors. Internal mirrors are normally attached by fritting in which a solder glass is employed to join the mirror to metal on the tube body. Heating the mirror by fritting results in loss of quality, reduction in power and shifting of the coating passband. The fritting process may also stress the optical materials and may lead to deposition of frit by-products such as binders on the mirrors. Bakeout after fritting leads to a deposition on the mirrors. High temperature activation of the cathode may also lead to such deposition.

Cold welding involves installing a thin sheet of cold weld material, e.g. indium, between the surfaces to be adhered and then pressing the surfaces together with enough pressure to cause the indium to flow and form a seal. Indium provides a low vapor pressure material which is cold weldable. Laser tube mirrors have previously been secured by cold welding. However, it has not been previously known to assemble a laser tube in the manner of the present invention such that the need for windows is eliminated and the mirrors, once secured, preferably by cold welding, are free of contamination and are ready for immediate use in normal service.

SUMMARY OF INVENTION

According to the invention a conventional gas laser tube is assembled without windows and is heated with both ends open in a vacuum oven to a temperature substantially in excess of the temperature to which heating would be restricted were windows present. Undesired gases and contaminates are removed. The operating gas, e.g. argon for an argon gas laser, is next admitted to fill the now-clean tube and mirrors are installed after which the tube is evacuated and then filled with the desired operating gas and tested. The tube is modified primarily by mounting the mirrors on bellows or other adjustable conduit means sealed to the ends of the tube to permit ease of alignment and to acccomodate to expansion.

DESCRIPTION OF PREFERRED EMBODIMENT

Figure 1:
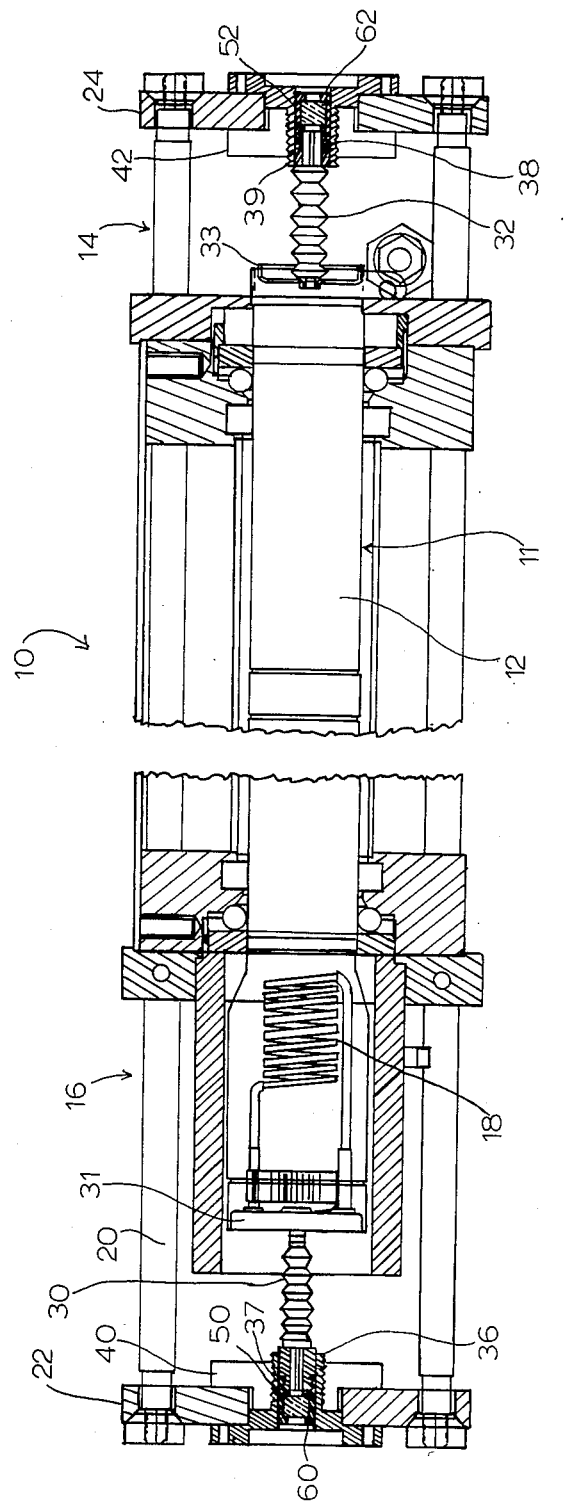
FIG. 1 is a somewhat schematic, sectional view of selected components of an argon gas laser with mirror mountings according to the invention.
Figure 2:
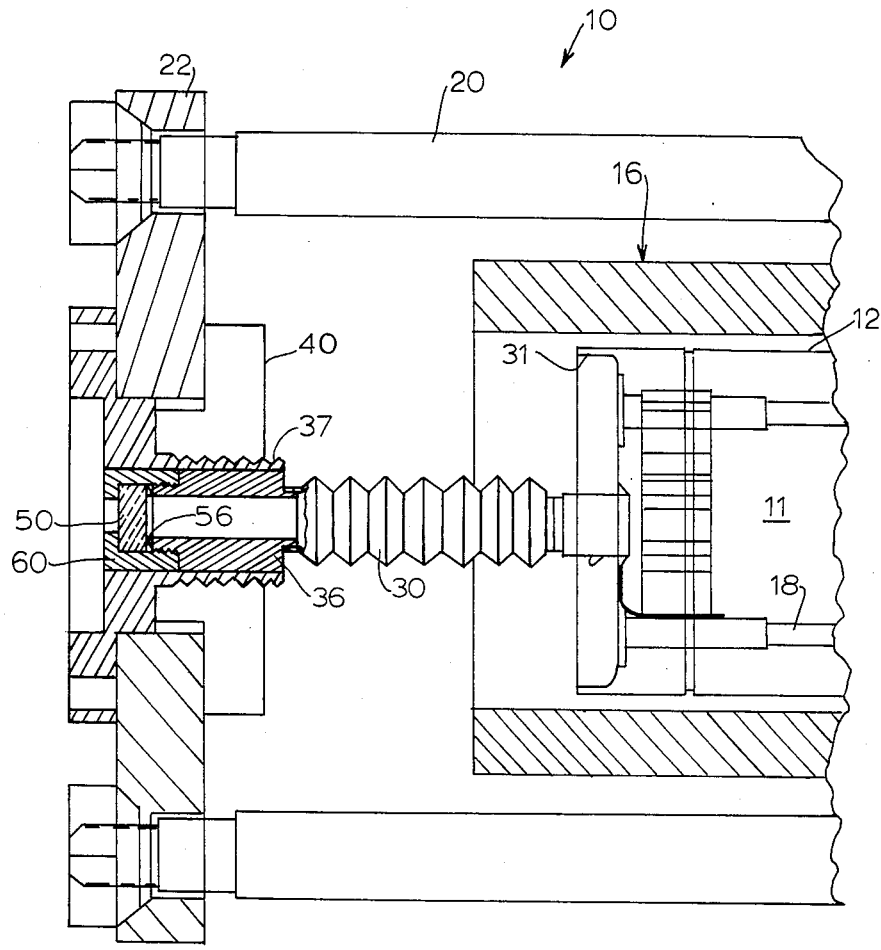
FIG. 2 is an enlarged view of the cathode end of FIG. 1 showing how the mirror is cold welded.

Making reference to the drawings there is illustrated selected components of a typical argon gas laser 10 modified according to the invention. Other components not necessary for understanding the invention have been eliminated for simplification. Laser 10 incorporates a laser tube 11 made up of segments 12 extending between an anode end 14 and a cathode end 16 fitted with a conventional cathode 18. Low vapor pressure materials are employed permitting baking at relatively high temperature to drive out the undesired gases and impurities. The metal-ceramic segment and internal cup support construction employed in the laser tube described in applicant's copending application Ser. No. 942,345 represent a preferred tube construction. Mirror mount support rods 20 extend from end to end between mirror mounts 22, 24.

Since laser tube 11 is of conventional construction except for the mirror mounting arrangement, the description will primarily concern itself with the mirror mounting assembly.

The cathode and anode terminal ends of tube 11 are extended by axially aligned metal bellows 30, 32 through which the laser beam passes. Bellows 30, 32 are welded or otherwise secured to outermost tube end cup members 31, 33 formed as described in applicant's copending application Ser. No. 946,345. Bellows 30, 32 in turn are welded or otherwise secured to and are extended by respective metal pedestals 36, 38. Pedestals 36, 38 are received within respective threaded collets 37, 39 and are secured by respective securing nuts 40, 42. The mirrors 50, 52 are secured by cold welding to the respective outer surfaces of pedestals 36, 38 after the tube 11 has been processed according to later description. Cold welding is effected by inserting an annular ring 56 of indium between the mirror surface to be adhered and the respective outer surface of the pedestal to which the mirror is be affixed. The outer ends of the pedestals 36, 38 have fine external threads on which mirror retainers 60, 62 are screwed to force the indium to flow and effect the desired cold seals. Retainers 60, 62 effectively act as screw on caps both to retain the mirrors and provide pressure to effect the seals. Indium represents a low vapor pressure material which is cold weldable and which itself does not introduce undesired contamination.

Having given a general description of the laser 10 in its final modified form, the description next turns to the particular method for processing the tube and attaching the mirrors. It is this method to which the invention is primarily directed.

Tube 11 is initially fabricated and is completed to the extent of installing the respective flexible bellows 30, 32 and pedestals 36, 38 which effectively extend the vacuum walls of the tube. An auxilary tube, not shown, permitting vacuum evacuation of the tube or introduction of gas to the interior of the tube is installed at the anode end of the tube. Tube 11 is at this stage thus an open ended tube. The tube is then processed according to the following steps:

(a) The open ended laser tube is installed in a vacuum oven and with the auxilary tube inoperative is heated to a temperature of approximately 450° C. to cause the undesired gases and contaminates to flow out of the tube and be withdrawn from the vacuum oven.

(b) In one embodiment of the invention, the cathode is energized at about 1100° C. during heating of the tube in the vacuum oven to remove all gases associated with activation and in another embodiment is not energized during such heating.

(c) Heating of the tube in the vacuum oven continues for several hours.

(d) After heating, the vacuum oven is backfilled with argon gas.

(e) The clean argon filled tube is next immediately connected to an argon gas source to maintain the tube filled with argon gas flowing out of the tube ends to prevent ambient air contamination.

(f) Next external mirrors are cold welded to their respective mounts as rapidly as possible and preferably in a sterile room or chamber by screwing the mirror retainers on the pedestals and against the mirrors and cold weld indium material.

(g) The tube is next transferred to a station having vacuum/gas fill sources.

(h) Continue normal processing of tube.

A comparison of the construction and method of the invention quickly reveals at least these advantages:

(a) An internal mirror system has been achieved without requiring the use of windows and the numerous disadvantages of using windows in an external mirror system.

(b) The tube can be heated to a temperature substantially in excess of 200° C. to drive out undesired gases and contaminants whereas when the tube is processed with windows in place the processing temperature cannot exceed a temperature of about 200° C.

(c) Mirrors can be quickly installed by screwing the mirror retainers in place to effect the cold weld seals and can be easily removed and replaced when necessary without requiring that the laser tube itself be replaced.

(d) The mirror is kept clean until just prior to being installed.

(e) All the disadvantages of the fritting process have been eliminated.

(f) Operating life of the laser tube is extended by driving out extraneous gases and contaminants from the tube in the vacuum oven.

What is claimed is:

1. A gas laser apparatus, comprising:
   (a) a gas laser tube having a bore extending between cathode and anode ends;
   (b) said laser tube terminating at each end with a bellows assembly operative to extend the length of the tube bore;
   (c) each said bellows assembly comprising:
      (i) an adjustably positionable metal bellows secured to a selected end of said tube;
      (ii) a tubular pedestal secured at one end to said bellows to form an extension thereof and at the opposite end providing a mirror mount surface;
      (iii) a mirror secured to said surface;
      (iv) a cold weld material located between said mirror and mirror mount surface; and
      (v) retaining means secured to said pedestal encasing the outer portion of said mirror and operative to apply pressure to said cold weld material to establish a cold weld seal between said mirror and mirror mount surface to retain said mirror on and prevent shifting of said mirror with respect to said mirror mount surface.

2. A gas laser apparatus as claimed in claim 1 wherein said cold weld material comprises indium.

* * * * *